Jan. 3, 1967  E. M. GROPEN  3,295,467
METHOD AND APPARATUS FOR FORMING ICE CREAM AND LIKE MATERIALS
Filed Jan. 13, 1964  2 Sheets-Sheet 1
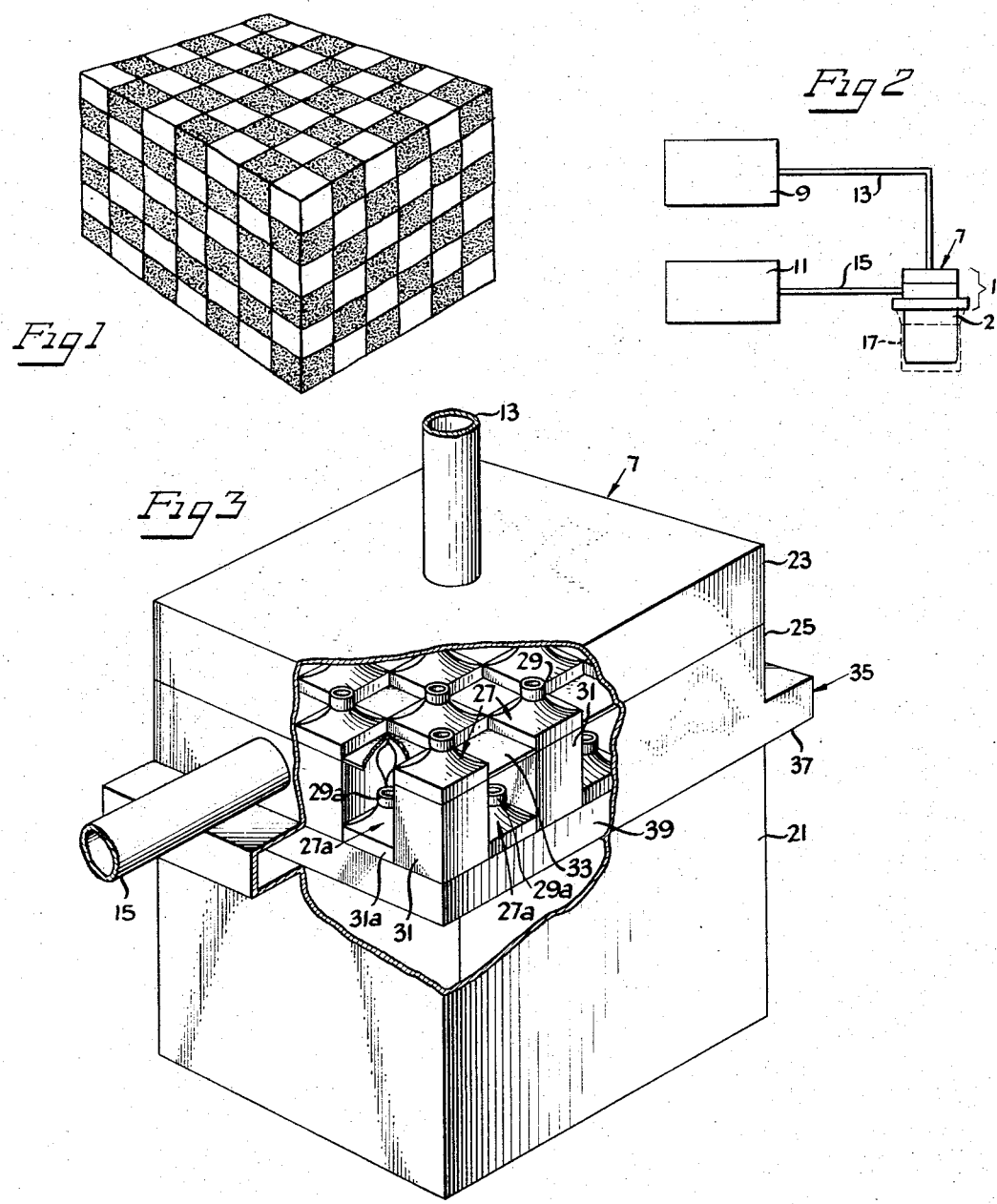
Inventor
Edward M. Gropen

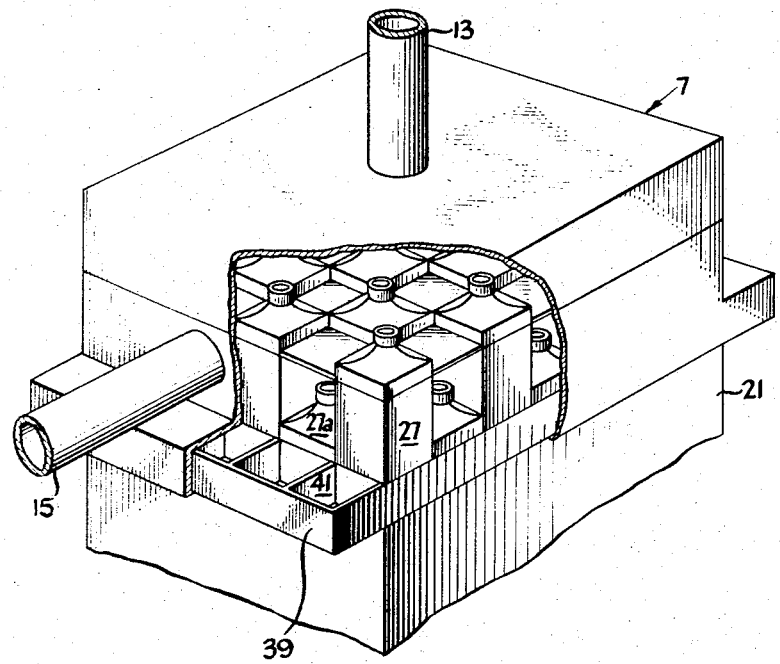
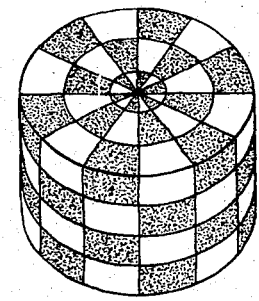
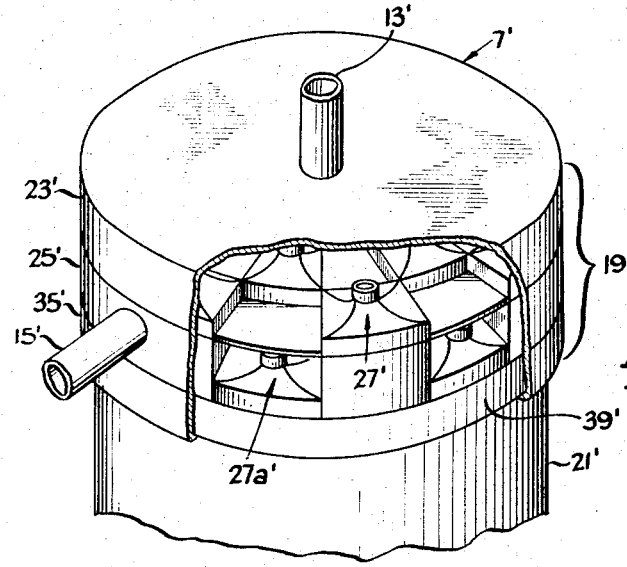

United States Patent Office 3,295,467
Patented Jan. 3, 1967

3,295,467
METHOD AND APPARATUS FOR FORMING
ICE CREAM AND LIKE MATERIALS
Edward M. Gropen, East Northport, N.Y., assignor to National Dairy Products Corporation, New York, N.Y., a corporation of Delaware
Filed Jan. 13, 1964, Ser. No. 337,994
17 Claims. (Cl. 107—1)

This invention relates generally to the manufacture of ice cream and like products and, more particularly, it relates to ice cream and like products having patterns of contrasting colors.

Various means are known and have been used for a number of years in the manufacture of patterned ice cream products, for example, the well known three flavored bricks of ice cream wherein the layers are usually each of a different color and flavor and the layers extend longitudinally of the bricks of ice cream. From time to time during various special seasons of the year, special colored designs have been incorporated into bricks of ice cream, such as a Santa Claus head, a shamrock, or George Washington's hatchet. In these bricks or blocks of ice cream, the different colored portions of the patterns extend longitudinally throughout the entire block of ice cream. Other multi-flovered and multi-colored ice creams, such as ripple ice cream, are well known in the ice cream field. These ripple ice creams include flavoring or other materials which streak throughout the ice cream.

However, available methods and apparatus have not provided means for furnishing a patterned ice cream, which, when cut in any of three planes perpendicular to each other provides a multiple ice cream pattern in each plane.

It is a primary object of this invention to provide improved means for manufacturing a patterned ice cream or like product and the product of such means. Another object of this invention is the provision of a new and novel method and apparatus for manufacturing a patterned ice cream or like product wherein a pattern is provided in three dimensions of the product.

A still further object of the invention is the provision of new and useful method and apparatus for making an ice cream block having abutting columns of contrasting colors and wherein the columns have transversely overlapping parts of contrasting colors, thereby providing a checkerboard pattern in an ice cream block in any of three planes which are perpendicular to each other. A further object of this invention is the provision of cylindrically shaped ice cream product having abutting columns of contrasting colors and having circumferentially arranged adjacent portions of contrasting colors, thereby providing a unique ice cream product.

These and other objects of this invention will be more clearly understood by reference to the following detailed description and by reference to the drawings in which:

FIGURE 1 shows a rectangular ice cream block made in accordance wtih the present invention;

FIGURE 2 is a schematic diagram of apparatus for forming the block shown in FIGURE 1;

FIGURE 3 is a perspective view, partially broken away, of a portion of the apparatus illustrated in FIGURE 2, the apparatus including a shuttle grid which is disposed in one position;

FIGURE 4 is a view similar to FIGURE 3 with the shuttle grid shown in a second position;

FIGURE 5 is a perspective view of a cylindrically shaped ice cream unit; and

FIGURE 6 is a perspective view, partially broken away, of a portion of apparatus for making the ice cream shape shown in FIGURE 5.

Apparatus of the invention is generally designated by numeral 7 and is supplied by two sources of ice cream, freezers being shown schematically in the drawings as the sources and being designated by the numerals 9 and 11. These ice creams are supplied from the freezers 9 and 11 in the form of different colored and/or different flavored ice cream. Thus, the freezer 9 may supply a chocolate ice cream and the freezer 11 may supply a vanilla ice cream through suitable supply lines 13 and 15 respectively, to the apparatus 7 of this invention.

The apparatus 7 discharges the product into a carton 17 which may either be square or round in cross section, depending upon whether the rectangular block shown in FIGURE 1 is being manufactured or the cylindrical block shown in FIGURE 5 is being provided.

The apparatus 7 includes a header 19 which is connected to a guide tube 21. The guide tube feeds the ice cream into the carton 17 and has the same cross section as the carton.

The header 19 comprises two manifolds 23 and 25 in superposed relation. The upper manifold 23 connects to the supply line 13 and the lower manifold 25 connects to the supply line 15 so that each of the manifolds may be filled with different ice cream. As shown in FIGURE 3, the upper manifold 23 communicates with a plurality of nozzles 27 which have inlet openings 29 and discharge sections 31 having outlets of generally square cross section. The nozzles are shown arranged in the manifold in a generally checkerboard pattern and intermediate portions are provided with plates 33 which separate the upper manifold 23 from the lower manifold 25.

Since only one supply line 15 is provided to feed the lower manifold 25, the sides of the discharge sections 31 of the nozzles 27 are formed to provide passageways in the lower manifold 25 and thereby permit ice cream to be distributed throughout the lower manifold 25.

The lower manifold 25 also includes a plurality of nozzles 27a having openings 29a for receiving ice cream. The nozzles 27a also include discharge sections 31a having outlets with generally square cross section. The nozzles 27a are located beneath the plates 33 and, therefore, are arranged in an alternate checkerboard pattern to that of the nozzles 27 in the upper manifold 23.

The nozzles 27 and 27a each communicate with a grid section of the header 19, the grid section being generally designated by numeral 35. This section 35 comprises a housing 37 located beneath the manifolds 23 and 25. The housing extends outwardly from opposite ends of the header 19. Within the housing 37 there is disposed a shuttle grid 39 having openings 41 of the same cross section as the nozzles 27 and 27a, i.e., generally square. The shuttle grid 39 has a height which is proportional to the height of the different colored sections of the product shown in FIGURES 1 and 5. Thus, the grid is proportioned to form a section of ice cream having the desired dimensions of the different colored sections shown in FIGURES 1 and 5. The shuttle grid 39 moves transversely in the header 19. The openings 41 in the shuttle grid 39 each fill with a portion of ice cream and discharge the formed portion into the guide tube 21.

The means for moving the shuttle grid 39 are not shown in the drawings but will comprise a mechanical arrangement for rapidly moving the shuttle grid 39 in the housing 35 between two positions. In one position, as shown in FIGURE 3, the outermost row of the shuttle grid will be blocked off by the outwardly extending portion of the grid section 35 at one transverse extreme of its movement. In its other position, as shown in FIGURE 4, the other outermost row of openings 41 will be blocked off by the other outwardly extending portion of the grid section 35.

It will be appreciated that additional manifolds may be superposed on the manifolds 23 and 25 shown in the drawings and such additional manifolds may be filled with ice cream of other color and/or flavor. Such additional manifolds would, of course, feed into certain of the nozzles 27 and 27a which would be blocked off from the original manifolds 23 and 25 and would discharge into the shuttle grid openings 41. As a result, a block of ice cream may be provided with three or more flavors and/or colors.

In the operation of the apparatus 7, ice cream is delivered from the freezers 9 and 11 into corresponding ones of the supply lines 13 and 15 to the manifolds 23 and 25. The nozzles 27 and 27a are filled through their openings 29 and 29a. The nozzles fill the openings 41 in the shuttle grid 39, except for the openings on one row at one of the extreme positions. When the openings 41 are filled, the shuttle grid 39 moves to its other extreme position, thereby causing the filled shuttle grid openings 41 except for the filled row at the other extreme position to underlie alternate nozzles which communicate with the other manifold. Continued pressure of ice cream causes the filled openings in the grid to be emptied into the guide tube 21 and be filled with an alternate flavored and/or colored ice cream. When the openings 41 again are filled with the alternate colored ice cream, the shuttle grid 39 is moved back to its first position and filled with the first-mentioned ice cream. Thus, cubes of ice cream are formed in the openings 41 and the cubes are alternately formed of different colored or flavored ice cream. The grid is delayed under each nozzle 27 and 27a for a time sufficient to fill the openings 41, whereupon the shuttle grid is quickly moved under alternate nozzles fill with a second colored or flavored ice cream. In this manner, the checkerboard block is formed as shown in FIGURE 1 with the checkerboard pattern being present when the block is cut in any of three planes perpendicular to one another.

It will be apparent that the timing of movement of the shuttle grid 39 throughout and the thickness of the grid 39 may be adjusted to provide a desired pattern.

As an alternate embodiment of the invention, the product may be formed in the shape shown in FIGURE 5 and the apparatus for forming this shape is generally designated by the numeral 7' in FIGURE 6. Since various parts of this alternate embodiment are similar, corresponding parts are similarly numbered and differentiated by the symbol prime ('). As shown in FIGURE 6, the apparatus 7' is generally cylindrical in shape and comprises a header 19' including an upper manifold section 23' and a lower manifold section 25'. These manifold sections are filled by means of supply lines 13' and 15', respectively. Each manifold communicates with nozzles 27' and 27a'. These nozzles are shaped, in cross section, with radially extending sides and with arcuate edges extending between the sides. The nozzles communicate with a circular shuttle grid 39' which has openings (not shown) corresponding to the nozzle discharge openings. The grid 39' is rotated between the nozzles 27' and 27a' to fill with alternate color and/or flavored ice cream to provide the product shown in FIGURE 5. The apparatus 7' operates in a similar manner to the apparatus 7, through filling of the openings in the shuttle grid and discharging them into the guide tube 21' located below the header 19'.

Because of the rotating movement of the grid 39' it is not necessary to provide a section corresponding to the grid section 35 which would block off any openings in the grid 39'.

It will be apparent that the product produced by the improved method and apparatus may be considered as having horizontal layers extending transversely of a longitudinally extending vertical axis. Within each layer, the sections of different materials are arranged in rows with adjacent sections in each row and adjacent sections of adjacent rows abutting or contacting each other and formed of different materials. In the rectangular block of FIG. 1, the rows are straight and extend parallel to the horizontal edges of the block. In the cylindrical block of FIG. 5, the rows in each layer are circular and are concentric with each other about the vertical longitudinal axis of the block. In both forms, the horizontal faces of each section of each row contact horizontal faces of different material and the vertical or longitudinally extending vertical faces of different material.

As the improved product is depicted in FIG. 1, adjacent contacting or abutting sections in each vertical column and abutting sections in each row and in adjacent rows in each horizontal layer are of different materials throughout the entire rectangular block. This same configuration or pattern is produced using the apparatus of FIGS. 2 to 4 in all of the vertical columns except the outermost columns along opposite outer vertical sides of the block formed by material extruded from the outermost parallel rows of discharge sections 31 and 31a adjacent the portions of the housing 37 extending outwardly from opposite ends of the header 19. As the grid moves into each of its end positions within one of the housing extensions, the adjacent end row of grid openings 41 is disposed within the extension so that these openings are inactive and do not receive any ice cream from the adjacent discharge sections 31 and 31a. Then, after the grid is shifted to the other end position, each of the cubes of ice cream in the previously inactive openings is pushed out by a stream of the same flavor so that a regular alternating pattern is not present in each of the aforementioned outermost columns. Instead, in each of these columns, there will be a sequence in each four horizontal layers of one section of one material followed by three sections of the other material. The regular alternating pattern of FIG. 1 is present however in all but the outermost vertical columns formed at the ends of the header and a block like that of FIG. 1 having the regular alternating configuration throughout all columns obviously may be produced by cutting off such outermost irregular columns formed in the apparatus of FIGS. 2, 3, and 4.

While this description primarily refers to ice cream, it will be understood that similar products such as sherbets and ices may be used. In addition, other products than ice cream may be employed which other products are flowable but viscous enough to retain their shape, as for example dough and puddings.

It will be seen from the foregoing that the applicant has provided a unique apparatus and method to give new products not heretofore known in the trade. The checkerboard pattern, produced by the apparatus shown in FIGURE 1, is provided in three dimensions which is believed to be wholly new. Similarly, the cylindrically shaped block shown in FIGURE 5 is believed to be new.

Various features of the invention are specified in the following claims.

What is claimed is:

1. A method for forming an ice cream-like product comprising first and second materials generally shaped in blocks having longitudinally and transversely extending faces of the first material abutting longitudinally and transversely extending faces of the second material, said method comprising the steps of forming a block of said first material and simultaneously forming a block of said second material in side by side relation, and forming another block of a different material adjacent and in contact with each of said first formed blocks and simultaneously moving each of first formed blocks by advancing the other blocks of different material.

2. A method for forming an ice cream-like product comprising two materials generally shaped in blocks having longitudinally and transversely extending faces of one material abutting longitudinally and transversely extending faces of another material, said method comprising the steps of forming blocks of said one material and simultaneously forming blocks of said other material in a layer to form a checkerboard pattern, forming a second layer of other blocks of said different materials in a checkerboard pattern with each block of one of said materials in the second layer contacting a block of the other of said materials in the first mentioned layer and, simultaneously with formation of the second layer, moving the blocks of the first layer by advancing said other blocks of said second layer.

3. A method for forming a cylindrically shaped ice cream-like product comprising two materials generally shaped in blocks having longitudinally and transversely extending faces of one material abutting longitudinally and transversely extending faces of another material, said method comprising the steps of forming blocks of said one material and simultaneously forming blocks of said other material in side by side relation to form a layer of blocks, such layer having a cylindrical periphery and extending transversely of the axis of such periphery, forming another layer of other blocks of said different materials with each block of one of said materials in such other layer contacting a block of the other of said materials in the first mentioned layer and, simultaneously with the formation of the other layer, moving the blocks of said first mentioned layer by advancing the blocks of the other layer longitudinally of said axis.

4. A method for forming an ice cream-like product comprising two materials generally shaped in cubes having longitudinally and transversely extending faces of one material abutting longitudinally and transversely extending faces of another material, said method comprising the steps of extruding in a first direction two different materials to form cubes in a checkerboard pattern, in a first layer extending transversely of the first direction, moving said layer edgewise of the layer and transversely of said first direction, then moving said cubes of said first layer in said first direction by further extruding said different materials in said checkerboard pattern until a second layer of cubes is formed with each cube in each layer engaging a cube of different material in the other layer, each of said layers having a thickness approximately equivalent to the width of the cubes in the layer.

5. In apparatus for forming an edible product of different materials, the combination of at least two manifolds each adapted to contain a different one of said materials, said manifolds having discharge nozzles with openings arranged in a pattern with adjacent openings communicating with different manifolds, a grid having openings arranged in a pattern similar to said pattern of said manifold openings, and product receiving means communicating with said grid openings for the advance of said materials to the product receiving means through said nozzle openings and the grid openings, said manifolds and said grid being supported for movement relative to each other and transversely of the direction of advance of said materials to form layers of sections of said materials in patterns corresponding to the patterns of said openings with adjacent sections in each layer and adjacent sections of adjacent layers being formed of different materials.

6. In apparatus for forming an edible product of rectangular shape and different materials, the combination of a header having at least two manifolds each adapted to contain a different material and having outlet nozzles terminating in rectangular openings arranged in a checkerboard pattern, and a flat grid disposed adjacent said nozzle openings and having rectangular openings arranged in a checkerboard pattern and adapted to register with the nozzle openings, said header and said grid being movable relative to each other between two positions in each of which different ones of said nozzle openings communicate with different ones of said grid openings to form layers of rectangular sections of said materials with adjacent sections in each layer and adjacent sections of adjacent layers formed of different materials.

7. A method of forming an edible product of different materials, said method comprising forming quantities of each of said materials into component sections and assembling said sections together to form superposed layers in a block with each layer having adjacent rows of contacting sections and with adjacent sections in each row and adjacent sections in adjacent rows in each layer and in adjacent layers contacting each other and formed of different ones of said materials.

8. A method of forming an edible product of different materials, said method comprising forming quantities of each of said materials into similarly sized and shaped small rectangular blocks and assembling said blocks together to form a larger rectangular block by assembling said small blocks in superposed rectangular layers each contacting at least one adjacent layer and made up of a plurality of rows of said small blocks with adjacent blocks in each row and adjacent blocks in adjacent rows contacting each other and formed of different materials and with adjacent blocks in adjacent layers contacting each other and formed of different materials.

9. In a method of forming an edible product of two different materials, the steps of forming a plurality of columns containing contacting sections of said different materials with sections of one material alternating with sections of the other material in each column, and subsequently bringing each column into side-by-side contacting relation with more than one other column with adjacent contacting sections in each column and adjacent contacting sections of adjacent columns composed of said different materials.

10. In a method of forming an edible product of different materials, the steps of forming a plurality of sections of said different materials, assembling a plurality of said sections of said different materials in contacting relationship in each of a plurality of columns, and assembling said columns in contacting relation by bringing every column into engagement with more than one other column with adjacent contacting sections in each column and adjacent contacting sections of adjacent columns composed of different materials.

11. In a method of forming an edible product of different materials, the steps of assembling a plurality of sections of said different materials to form a plurality of layers composed of sections of said different materials with each layer having a plurality of contacting rows of sections and with adjacent sections in each row and adjacent sections in adjacent rows in each layer contacting each other and composed of different materials and bringing said layers into contact with each other with adjacent contacting sections of adjacent layers being of different materials.

12. In a method of forming an edible product of different materials, the steps of assembling a plurality of sections of said different materials to form a layer having rows formed of sections of said different materials with sections of one material in each row and in adjacent rows engaging and alternating with sections of a different material in such row and the adjacent rows, forming a second similar layer and bringing the second layer into contact with the first layer with each section in one layer engaging a section of a different material in the other layer.

13. Apparatus for forming an ice cream-like product comprising two materials generally shaped in blocks having longitudinally and transversely extending faces of one material abutting longitudinally and transversely extending faces of the other material, said apparatus comprising in combination, a first manifold for said one material, a second manifold for said other material, a first nozzle communicating with said first manifold, a second nozzle communicating with said second manifold, a shuttle grid including generally block shaped openings positioned to communicate with said first and second nozzles, actuating means connected to said shuttle grid whereby one of said openings in said shuttle grid is moved from communication with said first nozzle after being filled with said one material from said first manifold into communication with said second nozzle for reception of the other material from said second manifold and consequent ejection of said one material from said one opening to form a product comprising alternate sections of said materials, and product receiving means in communication with said openings in said shuttle grid to receive said product from the grid.

14. Apparatus for forming an ice cream-like product comprising two materials generally shaped in rectangular blocks having longitudinally and transversely extending faces of one material abutting longitudinally and transversely extending faces of another material, said apparatus comprising in combination, a first manifold for said one material, a second manifold for said other material, a first nozzle communicating with said first manifold, a second nozzle communicating with said second manifold, a shuttle grid including at least three generally rectangular block shaped openings positioned to communicate with said first and second nozzles for forming the rectangular blocks, said shuttle grid being movable from one position in which first and second ones of said openings communicate respectively with said first and second nozzles and are filled respectively with said different materials from said first and second manifolds to another position in which said second opening and a third one of the openings communicate respectively with said first and second nozzles and are filled respectively with said different materials from said first and second manifolds, said other material received in said second opening in said one position being ejected from the opening by said one material in said other position to form a product comprising alternate sections of said materials, and product receiving means in communication with said openings in said shuttle grid to receive said product from the grid.

15. Apparatus for forming a generally cylindrical ice cream-like product comprising two materials generally shaped in blocks having longitudinally and transversely extending faces of one material abutting longitudinally and transversely extending faces of another material, said apparatus comprising in combination, a first manifold for said one material, a second manifold for said other material, a first nozzle communicating with said first manifold, a second nozzle communicating with said second manifold, a generally circular shuttle grid including generally block shaped openings positioned to communicate with said first and second nozzles and having a depth approximately the same as the depth of the blocks, said shuttle grid being movable to bring one of said openings in said shuttle grid from communication with said first nozzle after being filled with said one material from said first manifold into communication with said second nozzle for reception of the other material from said second manifold and consequent ejection of said one material from said one opening to form a product comprising alternate sections of said materials, and product receiving means in communication with said openings in said shuttle grid to receive said product from the grid.

16. Apparatus for forming an ice cream-like product comprising two materials generally shaped in cubes having longitudinally and transversely extending faces of one material abutting longitudinally and transversely extending faces of another material, said apparatus comprising in combination, a first manifold for said one material, a second manifold for said other material, a first nozzle communicating with said first manifold, a second nozzle communicating with said second manifold, said nozzles having generally square outlets, a shuttle grid including at least three generally cube shaped openings positioned to communicate with said outlets of said first and second nozzles for forming the cubes, said shuttle grid being movable from one position in which first and second ones of said openings communicate respectively with said first and second nozzles and are filled respectively with said different materials from said first and second manifolds to another position in which said second opening and a third one of the openings communicate respectively with said first and second nozzles and are filled respectively with said different materials from said first and second manifolds, said other material received in said second opening in said one position being ejected from the opening by said one material in said other position to form a product comprising alternate sections of said materials, and product receiving means in communication with said openings in said shuttle grid to receive said product from the grid.

17. Apparatus for forming an ice cream-like product comprising two materials generally shaped in cubes having longitudinally and transversely extending faces of one material abutting longitudinally and transversely extending faces of another material, said apparatus comprising in combination, a first manifold for said one material, a second manifold for said other material, a plurality of first nozzles communicating with said first manifold, a plurality of second nozzles communicating with said second manifold, said nozzles having generally square outlets, said outlets being arranged in a checkerboard configuration, a shuttle grid having generally cube shaped openings positioned to communicate with said outlets of said first nozzles and second nozzles for forming the cubes, actuating means connected to said shuttle grid whereby said shuttle grid is moved to bring certain of said grid openings from communication with said first nozzles after being filled with said one material from said first manifold into communication with said second nozzles for reception of said other material from said second manifold and consequent ejection of said one material from said certain openings to form a product having alternate sections of said materials, and product receiving means in communication with said openings in said shuttle grid to receive said products from the grid.

References Cited by the Examiner

UNITED STATES PATENTS

| | | | |
|---|---|---|---|
| 1,260,558 | 3/1918 | Lebler | 107—1.4 |
| 1,281,592 | 10/1918 | Laskey | 107—1.4 |
| 1,951,694 | 3/1934 | Goulstone | 107—54 |
| 2,135,808 | 11/1938 | Friedman | 99—137 |
| 2,167,353 | 7/1939 | Frediani | 99—137 |
| 2,316,165 | 4/1943 | Howser | 107—54.4 |
| 2,347,162 | 4/1944 | Watts | 107—54.4 |
| 2,893,605 | 7/1959 | Anderson | 107—1 X |

OTHER REFERENCES

Culinary Art Institute Encyclopedic Cookbook, Grosset and Dunlap, New York, 1948, p. 203.

WALTER A. SCHEEL, *Primary Examiner.*

C. LOUIS MONACELL, *Examiner.*

S. J. BAICKER, J. SHEA, *Assistant Examiners.*